Jan. 5, 1960 P. MALLERY 2,920,317

CODE TRANSLATORS

Filed Sept. 17, 1958 2 Sheets-Sheet 1

INVENTOR
P. MALLERY
BY Kenneth B Hamlin
ATTORNEY

CODE TRANSLATORS

Filed Sept. 17, 1958 2 Sheets-Sheet 2

INVENTOR
P. MALLERY
BY Kenneth B. Hamlin
ATTORNEY 2,920,317
Patented Jan. 5, 1960

2,920,317

CODE TRANSLATORS

Paul Mallery, Murray Hill, N.J., assignor to Bell Telephone Laboratories, Incorporated, New York, N.Y., a corporation of New York Application September 17, 1958, Serial No. 761,589

10 Claims. (Cl. 340—347)

Figure 1:
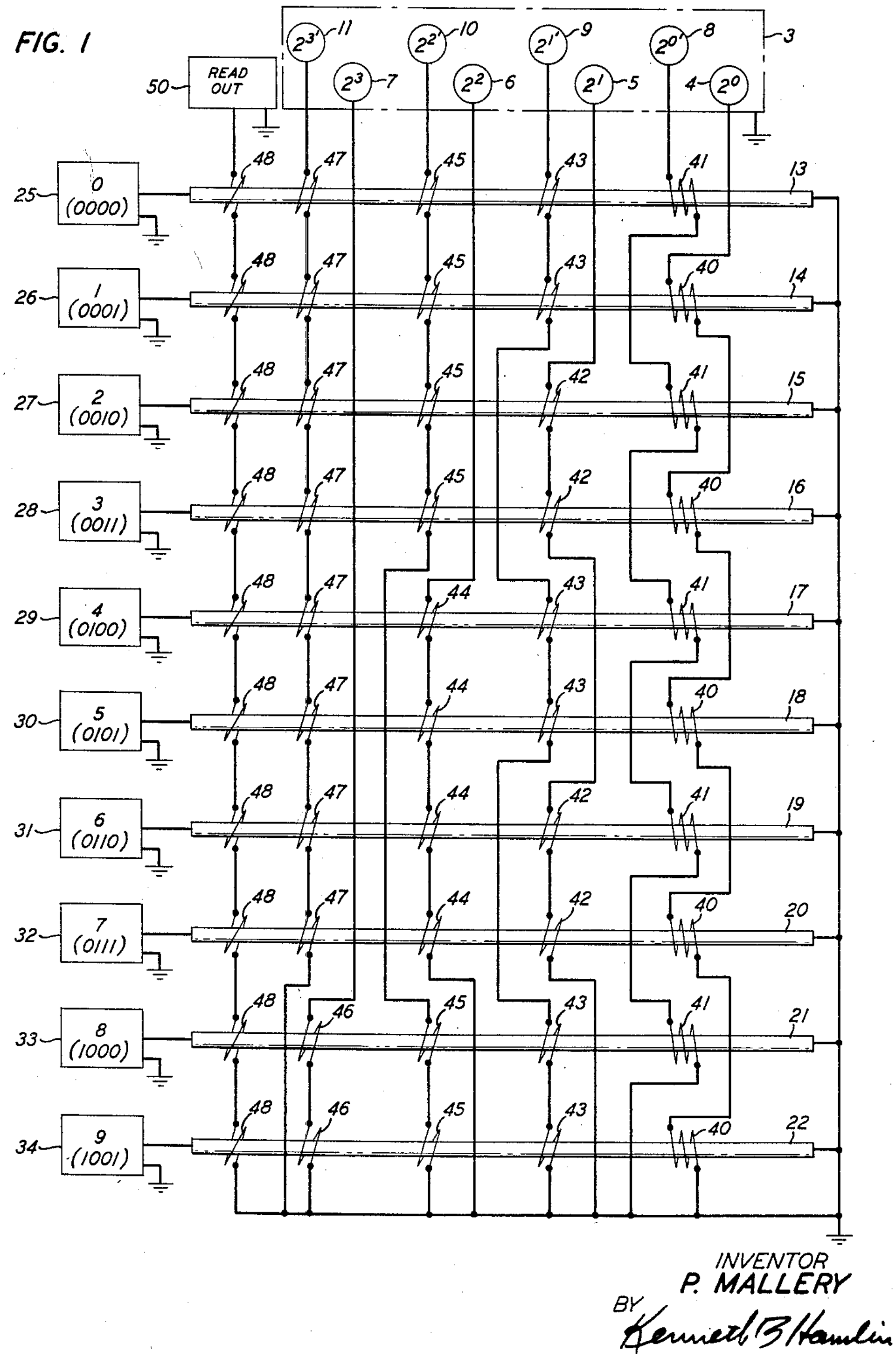

This invention relates to apparatus for translating information between systems of positional notation employing different bases and, more particularly, to such apparatus utilizing sequential pulse methods.

The representation of numerical information in digital computing systems is commonly predicated upon the use of a scheme of positional notation wherein digits are arranged in sequence with the understanding that successive digits are to be interpreted as coefficients of successive powers of an integer that is called the base. In the binary system the base is 2 and in the decimal system the base is 10. Since digital computer elements most frequently operate exclusively in the binary mode while the contemporary or Arabic method of numerical computation is in the decimal mode, various devices have heretofore been proposed for converting from binary to decimal representation and vice versa. Translation is frequently achieved through the use of a four-bit binary positional sequence to represent decimal numbers, the consecutive positions in the four bit sequence representing coefficients of corresponding powers of the base 2. In a representative digital computing system, each of the four binary variables may be assigned to a signaling lead wherein "single rail" logic obtains, or both the variable and its prime may be utilized wherein "double rail" logic obtains in which latter case both the variable and its prime are assigned to signaling leads. The translating devices of the prior art utilizing diode-resistance matrices or magnetic cores in various matrix switching arrangements in the usual mode of operation require simultaneous energization of the selected ones of the signaling leads in order to effect the selection of the desired translational output, such selection being accomplished on a signal amplitude basis. The tendency of the amplitude of unwanted signals (contributed by the finite excursions of core flux in the saturation regions, and by the non-uniform resistance characteristics exhibited by commercially available diodes) to give rise to erroneous output indications is a drawback to such priorly conceived devices and a tendency which progressively becomes worse with the increase in complexity or order of the translational matrix required to be employed.

It is, accordingly, a general object of the present invention to effect an improvement in binary coded translators.

The present invention advantageously makes use of the basic "Twistor" structure disclosed in the copending application of A. H. Bobeck, Serial No. 675,522, filed August 1, 1957, and also discussed in the November, 1957, issue of the Bell System Technical Journal together with the principles of switched region propagation disclosed in the copending application of A. H. Bobeck, Serial No. 752,905, filed August 4, 1958 to achieve a numerical expression translating system possessing distinctive advantages.

In the above-referenced article, the "Twistor" is defined as a magnetic conductor within which a preferred helical flux path is established and into which magnetic conductor information may be inserted in the form of a polarized helical magnetization. The information is sensed using the magnetic conductor as a sensing means by detecting the polarity of the voltage produced across the ends of the magnetic conductor as its magnetization state is changed.

In the above, second-mentioned copending application of A. H. Bobeck, the interaction effects which exist between magnetized regions on a magnetic wire such as the wire employed in the "Twistor" are utilized to "slide" a magnetized region along the magnetic wire under the control of externally applied magnetizing forces established by a plurality of phase windings. The principle upon which the operation of this device is believed to be formulated is that there is associated with a stable magnetic spot a minimum critical length below which the spot is unstable. Stated another way, the magnetic material exhibits a substantially square loop or two-state hysteresis characteristic when excited by a magnetomotive force over at least a minimal dimension. A stable magnetized region, i.e., one within which a stable hysteretic state has been established, is operated upon therein by phase windings, each of which is less than the critical length, such that the forward energization of a phase winding at the head end of a magnetic spot and the reverse energization at the tail end of a magnetic spot will cause the magnetic spot to appear to move in a definite direction along the magnetic wire.

I have discovered that the ability to extend a switched region on a twistor, as is demonstrated in the above-noted copending application, may be exploited to translate binary codes into decimal form. In accordance with the principles of this invention a plurality of windings are distinctively arranged over each of a number of magnetic conductors so that predetermined ones of the windings when sequentially energized by individual code elements of an input information signal source will excite contiguous subminimal lengths of the magnetic conductors to comulatively extend to a predetermined point in but one magnetic conductor a particular hysteretic state which state, when sensed at such predetermined point, identifies the one magnetic conductor corresponding to the input information signal. In one specific illustrative embodiment thereof, a two-rail binary information signal source determines the cumulative extension of a magnetic state in one among ten twistor wires according to the sequential energization therein of three adjacent subminimal length windings in juxtaposition with a fourth longer winding of at least minimal length which latter winding establishes the stable spot from which the magnetic state is extended. In another illustrative embodiment, a single rail binary information source determines the cumulative extension of a preset magnetic state in one among the twistor wires by sequentially energizing subminimal length advance windings on predetermined ones of such twistor wires and simultaneously energizing longer, inhibiting windings linking the remainder twistor wires.

Accordingly, it is a feature of the present invention that the selective extension of a particular hysteretic state be effected in one of a plurality of magnetic elements by the sequential energization of a plurality of windings linking the magnetic elements according to a predetermined pattern.

It is another feature of this invention that a code translator include a plurality of magnetic conductors each having a read out winding and an initial winding positioned from the read out winding, the initial winding being of sufficient length to establish a stable magnetic spot and there being extending windings between the initial winding and the read out winding of each conductor, the extending windings being of insufficient length individually to establish stable magnetic spots and also being uniquely arranged on each conductor in accordance with the code being translated.

It is a feature of one specific embodiment of the present invention that there be associated with each of a plurality of magnetic elements one winding of each pair of a plurality of paired input winding circuits to define a sequence of contiguous subminimal length areas in each magnetic element, predetermined ones of said input winding circuits being energizable to extend throughout the defined elemental areas a magnetic spot established in such magnetic element.

It is a feature of another specific embodiment of the present invention that a spot of magnetization be set in each of a plurality of magnetic elements at a predetermined distance from a read-out winding linking each of the magnetic elements and that a predetermined number of input windings link selected ones of the magnetic elements to extend the set spot in but one of the magnetic wires and to inhibit the extension thereof in the remaining ones of such wires.

Figure 2:
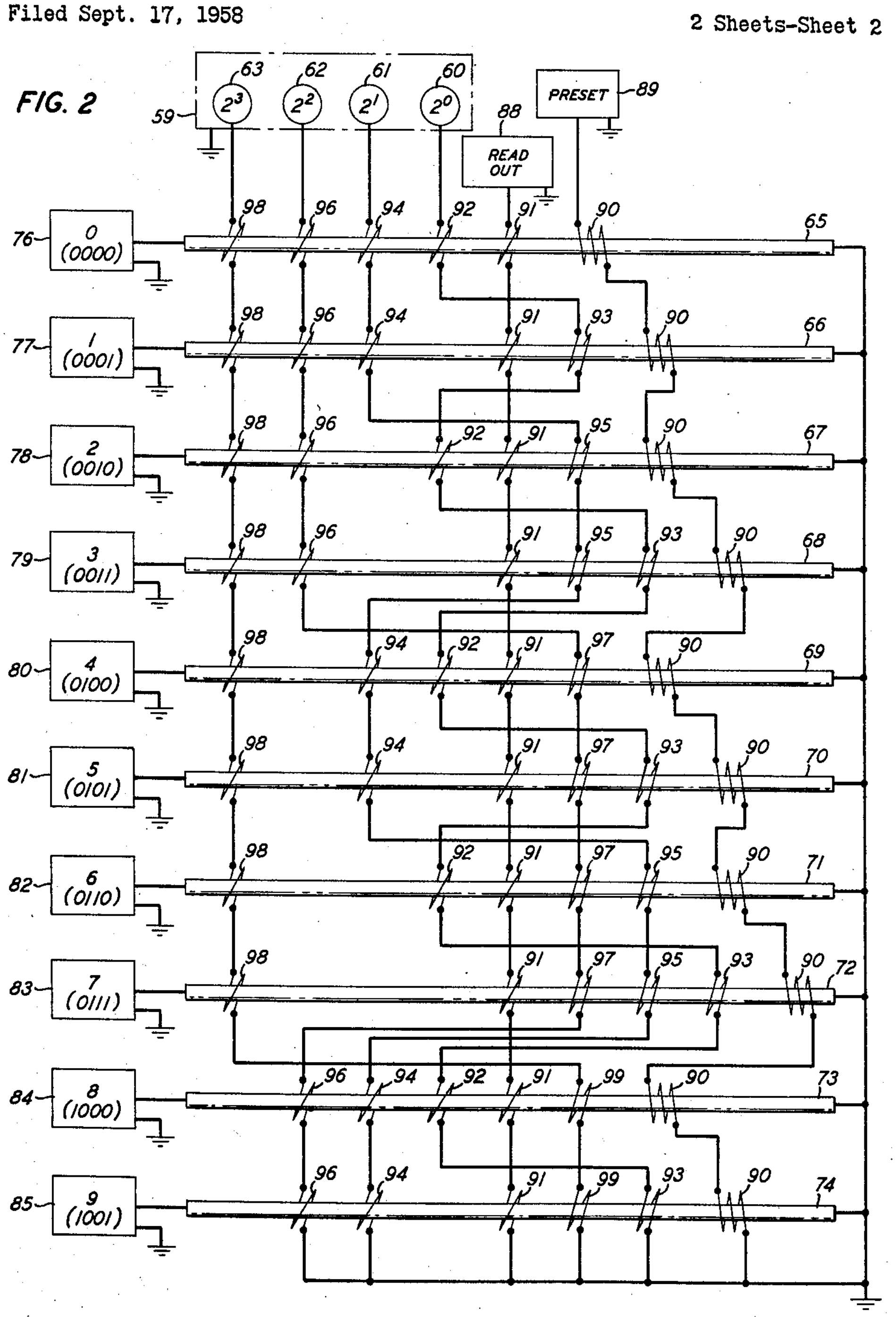

The foregoing and other objects and features of the present invention may be more readily understood from the following description of illustrative embodiments thereof when read with reference to the accompanying drawing in which:

Fig. 1 shows in schematic form an illustrative embodiment of a binary to decimal translator in accordance with the principles of the invention; and Fig. 2 shows in schematic form an alternative embodiment of a binary to decimal translator.

Referring now to Fig. 1 there is shown a binary to decimal signal translator comprising binary input signal source 3 including code element signal sources 4 through 7 and 8 through 11. The former group of code element signal sources represent the binary input variables $2^0$ to $2^3$, respectively, and the latter group the binary input variables $2^{0'}$ to $2^{3'}$, the sources together comprising a "two rail" logic input. Ten magnetic conductors 13 to 22, such as the above-referred to "Twistor" elements, are each respectively conductively connected to corresponding ones of a series of ten utilization circuits 25 to 34 which utilization circuits comprise the decimal output of the translator.

Connected to code element signal sources 4 and 8, respectively, are set windings 40 and 41 which windings are at least a minimal length and are capable of establishing a particular hysteretic state or "1" in the localized region in each of the magnetic conductors 14, 16, 18, 20, 22 and 13, 15, 17, 19, 21 to which they are respectively coupled.

Connected to code element signal sources 5 and 9, respectively, are advance windings 42 and 43. Advance windings 42 are inductively coupled to magnetic conductors 15, 16, 19 and 20 and advance windings 43 are inductively coupled to magnetic conductors 13, 14, 17, 18, 21 and 22. Code element signal source 6 is connected to advance windings 44 which windings are coupled to magnetic conductors 17 to 20, while code element signal source 10 is connected to advance windings 45 and inductively coupled to magnetic conductors 13 to 16 and 21 to 22. Code element signal sources 7 and 11 are respectively connected to advance windings 46 and 47 which windings are coupled to magnetic conductors 21 to 22 and 13 to 20, respectively. Windings 48 are inductively coupled to each of magnetic conductors 13 to 22 in opposite sense to that of set and advance windings 40 to 47 and windings 48 are connected to be energized by read out source 50.

Each of the advance windings 42 to 47 is of less than the above mentioned minimal length and accordingly provides a magnetomotive force of less than sufficient magnitude by itself to establish in any of the elemental areas of magnetic conductors 13 to 22 to which they are inductively coupled a distinctive hysteretic state such as is effected therein by windings 40 or 41. When, however, a set region of stable magnetization is established by set windings 40 or 41 in a portion of a magnetic conductor adjacent to one of the advance windings 42 or 43, these latter windings, in accordance with the principles disclosed in the above-cited copending application Serial No. 752,905 of A. H. Bobeck, are capable of extending the region so set. Similarly, windings 44 to 47 provide a magnetomotive force sufficient only to extend an adjacent magnetic spot but not sufficient by themselves to establish such a spot.

In operation, each of the magnetic conductors 13–22 is first reset throughout its length to the "0" hysteretic state. This reset throughout the entire magnetic conductor length may advantageously be accomplished by read out source 50 supplying to read out windings 48 a high amplitude pulse following the normal read out pulse (which normal read out pulse merely establishes the "0" hysteretic state in the magnetic conductors in the immediate vicinity of the respective windings 48). Equally advantageously, each of the magnetic conductors 13–22 may be provided with a separately excited reset solenoid (not shown) extending from read out winding 48 over (or under) advance windings 42—47 to the set windings 40 and 41. In operation, the code element signal sources 4 or 8 will be actuated to establish the "1" hysteretic state or region of magnetization in each of the magnetic conductors with which they are respectively associated. Thereafter, actuation of code element signal sources 5 or 9 will function to extend the "1" regions of magnetization priorly established by set windings 40 or 41 in those magnetic conductors whose advance windings have now been energized that are adjacent to the priorly energized ones of the set windings. Similarly, actuation of code element signal sources 6 or 10 and then 7 or 11 will function to further extend the "1" region in those magnetic conductors whose now energized advance windings are adjacent to the priorly energized ones of the advance and set windings. Assuming the energization of the code element signal sources in the sequence 4, 5, 6, 11, representing an input binary code 0111, the "1" region of magnetization set up in magnetic conductors 14, 16, 18, 20 and 22 by energization of binary input signal source 4 will be extended upon energization of advance windings 42 in magnetic conductors 16 and 20 and will be further extended upon energization of advance windings 44 and 47 in magnetic conductor 20 only. The "1" region of magnetization which has been cumulatively extended so that a portion thereof lies under or in the immediate vicinity of one of the windings 48 as for example, that above-discussed in connection with the sequence 4, 5, 6, 11 in magnetic conductor 20 may now be sensed by the energization of windings 48 by read out source 50 to deliver a signal pulse to utilization circuit 32. The amplitude of the magnetomotive force applied to the magnetic conductors 13–22 incident to this read out phase is limited by read out source 50 to that which will just reverse that hysteretic state in the immediate vicinity of windings 48 which was extended by advance windings 46 or 47 but which magnetomotive force is not sufficient to affect the hysteretic state in the magnetic conductors under any of windings 40 through 45.

Translation from double-rail binary input signals to a decimal output is thus achieved by establishing a particular hysteretic state in a portion of selected ones of ten magnetic conductors, sequentially energizing advance windings corresponding to the presence or absence of the particular binary input variables to effect, according to the order of energization of the advance windings in each of the magnetic conductors, the extension of the hysteretic state in a particular one of the ten magnetic conductors to a read out winding.

In Fig. 2 there is shown an alternative embodiment of a binary to decimal translator employing a single rail binary information source 59 including code element signal sources 60 to 63, ten magnetic conductors 65 to 74 having subminimal length advance windings 93, 95 and 97 wound thereon, and ten utilization circuits 76 to 85 which latter circuits comprise the decimal output of the translator. In this embodiment preset pulse source 89 establishes via set windings 90 a stable set region of magnetization in each of the magnetic conductors 65 to 74 at distinctive predetermined distances from read out windings 91. Code element source 60 is connected to inhibit windings 92 on magnetic conductor 65, 67, 69, 71 and 73 which inhibit windings provide in the respective magnetic conductors a magnetomotive force of opposite polarity to that of set windings 90 and source 60 is connected to advance windings 93 on magnetic conductors 66, 68, 70, 72 and 74 which advance windings provide a magnetomotive force in these last-mentioned magnetic conductors of the same polarity as set windings 90. Code element signal source 61 is connected to inhibit windings 94 on each of magnetic conductors 65, 66, 69, 70, 73 and 74 that are similar in effect to windings 92 and code element signal source 61 is connected to advance windings 95 on each of the remaining magnetic conductors which advance windings 95 are of the same polarity as set windings 90. The sense of the inhibit windings 92, 94, 96, 98 from binary input signal sources 60 to 63, respectively, which windings are schematically shown to the left of read out winding 91, as well as read out windings 91, are of opposite polarity to that of the set and advance windings 90, 93, 95, 97, 99 shown to the right of windings 91. While the inhibit windings 92, 94, 96 and 98 have all been schematically depicted as being positioned to the left of read out windings 91 it is to be understood that this has been done solely for the purposes of pictorially distinguishing these windings from the advance windings 93, 95, 97 and 99. In actual practice the inhibit windings 92, 94, 96, 98 may be advantageously positioned on the magnetic conductors in accordance with known magnetic principles so as to optimize their inhibiting effect in the respective magnet elements.

In operation, preset pulse source 89 establishes a "1" or stable spot of magnetization in each of the magnetic conductors 65 to 74 via energization of set windings 90 which stable spot will be cumulatively extended in but one of the magnetic conductors 65 to 74 according to the sequence of energization of selected ones of code element signal sources 60 to 63: The inhibit windings 92, 94, 96, 98 serve the following purpose. Suppose it is desired to select the decimal 3 utilization circuit 79 which is connected to magnetic conductor 68. This requires that code element signal sources 60 and 61 sequentially energize advance windings 93 and 95 in that order so that the stable spot established by set winding 90 may be extended under the read out winding. While windings 95 also link magnetic conductor 67 which is connected to the decimal 2 utilization circuit 78 and while windings 93 also link magnetic conductor 66 which is connected to the decimal 1 utilization circuit 77 extension of the magnetic spot is inhibited and the magnetic spot is itself erased in magnetic conductors 67 and 66 due to the action of inhibiting windings 92 and 94, respectively, which are each energized simultaneously with their respective serially connected advance windings 93 and 95. Should a stagger of code element signals occur, i.e. should windings 95 be energized before windings 93 instead of afterwards, a stable spot could erroneously be established and advanced in magnetic conductor 67, i.e., the decimal 2 twistor and no output would be obtained from magnetic 68 because of the failure to energize the windings in the proper sequence. To cope with this eventuality there is connected in circuit with source 60 and windings 93 the inhibit windings 92 which are capable of completely switching each twistor to which they are coupled to zero. Thus, energization of the windings 93 will prevent false indication in twistor 67 due to the inhibiting action of windings 92 and energization of windings 95, by virtue of the serially connected inhibiting windings 94, prevents erroneous indication in twistor 66.

Translation from single-rail binary input signals to a decimal output is thus achieved by establishing a particular hysteretic condition at a predetermined point in each one of a plurality of twistor elements, by sequentially energizing predetermined advance windings which lie consecutively between the predetermined point and a read out winding by inhibiting or erasing such hysteretic condition in the remaining twistors and by energizing the read out winding to obtain across the ends of only such one twistor an identifying voltage.

Incident to the signal input operation of the apparatus of Fig. 2 it may be noted that upon the energization of any of the inhibiting windings 92, 94, 96, 98 to erase the hysteretic spots established by windings 90 in the nonselected twistors there is simultaneously produced across the ends of each such nonselected twistor a voltage quite similar to that produced across the ends of the selected twistor when the read out windings are energized. Since the signal input and read out operations occur during entirely distinct intervals of time no confusion of the two voltages is possible. Additionally, however, as is known, a gate (not shown in the drawing) controlled by the read out source 88 may advantageously be inserted between the utilization circuits 76–85 and the twistors 65–74 to preclude any voltages being applied to the utilization circuits 76–85 except during operation of read out source 88.

In Fig. 1 the spacings between windings 40 to 48 on each of the magnetic conductors and in Fig. 2 the spacing between windings 90—99 on each of the magnetic conductors as well as the relative dimensions of the windings and the magnetic conductors have been exaggerated in the schematic representation for the purposes of clarity in illustrating the pattern of the coupling arrangement between the windings and the different magnetic conductors. It is to be understood, in accordance with the criteria set forth above as well as in the cited copending application Serial No. 752,905 of A. H. Bobeck, that the winding lengths and spacing between consecutive advance windings on any given magnetic conductor is to be adjusted to optimize the effects produced by switching a minimal magnetic conductor segment at the edge of a stable magnetized region and to prevent the extension of the magnetized region by energization of other than contiguous and consecutive advance winding.

In one illustrative translator embodiment constructed in accordance with the principles hereinbefore set forth, a 10 mil (.010 inch), diameter "twistor" wire of nickel was utilized for the magnetic elements herein specified together with a closely wound set winding approximately one-half inch long. The spacing between one end of the set winding and the first of the advance windings each of which consists of 4 to 5 edge-wound turns, one turn in length was of the order of 100 mils (.100 inches) while the spacing between the advance windings was approximately 50 mils (.050 inches). Current suitable to excite the extending windings was found to lie in the range of .3 to .5 amperes. It is to be understood, however, that this range and the above values and dimensions are not to be construed as limiting the application of the invention in any manner but are included merely as descriptive of data obtainable from a particular embodiment thereof.

What have been described are considered to be only illustrative embodiments of the present invention and it is to be understood that numerous other arrangements and modifications as well as other applications may be devised by one skilled in the art without departing from the spirit and scope of this invention.

What is claimed is:

1. A code translator comprising a plurality of elongated magnetic conductors each exhibiting a two-state hysteresis characteristic over at least a minimal length, means for establishing a stable hysteresis state of at least said minimal length in a portion of each of said conductors, a unique grouping of subminimal length windings coupled to each of said conductors adjacent said portion, said groupings being in accordance with a predetermined code to be translated, means for sequentially energizing contiguous subminimal length windings of a particular grouping in accordance with the code to be translated to cumulatively extend said stable state along a particular one of said conductors, said energizing means including a plurality of sequentially operating signal pulse sources, and means for detecting the presence of said stable hysteresis state cumulatively extended along said particular one of said conductors.

2. A code translator in accordance with claim 1 further comprising inhibiting windings on said conductors, at least one of said inhibiting windings being connected to an operated signal pulse source for each of said conductors except said particular one of said conductors.

3. A code translator in accordance with claim 1 wherein said conductors have established in each thereof a preferred helical flux path and wherein said means for detecting said cumulatively extended hysteresis state comprises read out winding means coupled to said conductors remote from said portion, means for energizing said read out winding to switch said stable hysteresis state when cumulatively extended thereunder, and means connected across the ends of said conductors and responsive to the voltage generated therein when said read out winding is energized.

4. A code translator comprising a plurality of elongated magnetic conductors each exhibiting a two-state hysteresis characteristic over at least a minimal length, means for establishing a particular hysteresis state in a predetermined portion of each of said conductors, a read out winding coupled to each of said conductors remote from said predetermined portion, a unique grouping of contiguous subminimal length windings linking each of said conductors between said predetermined portion and said read out winding, circuit means distinctively connecting each of said subminimal length windings on each conductor to subminimal length windings on other of said conductors, and means for selectively applying a current to predetermined ones of said circuit means to extend said particular state from said predetermined portion to said read out winding in one of said conductors.

5. A code translator in accordance with claim 4 wherein said conductors each have a preferred helical flux path established therein.

6. A code translator as defined in claim 5 further comprising means for energizing said read out winding and means connected across the ends of said conductors for detecting the voltage generated in said one of said conductors when said read out winding is energized.

7. A code translator in accordance with claim 6 wherein said means for energizing said read out winding comprises a two-level pulse generator for producing a low amplitude read out pulse to switch said particular hysteresis state only under said read out winding and a higher level erase pulse to switch said particular hysteresis state throughout each of said elongated magnetic conductors.

8. In a code translator, the combination comprising a plurality of magnetic conductors each exhibiting a two-state hysteresis characteristic over at least a minimal length, a plurality of read out windings each coupled to a corresponding position on a respective one of said conductors, means for establishing a stable hysteresis state in a portion of each of said conductors including a preset winding of at least said minimal length coupled to each of said conductors at a distance from the read out winding coupled thereto, a plurality of subminimal length extending windings coupled to predetermined ones of said conductors between the preset winding and the read out winding coupled thereto, a plurality of inhibiting windings each of at least said minimal length coupled to predetermined ones of said conductors, a plurality of circuit means uniquely interconnecting said inhibiting windings and predetermined ones of said extending windings, means for selectively energizing said circuit means to inhibit said stable hysteresis state in certain of said conductors and to extend said stable state from said portion to said read out winding in a particular one of said conductors, means for energizing said read out winding, and means coupled to said conductors for detecting the voltage produced in said particular one of said conductors when said read out winding is energized.

9. In code translator, the combination comprising a plurality of elongated magnetic conductors exhibiting two-state hysteresis characteristics over at least a minimal length, each of said conductors corresponding to code elements of a first notational system, first coupling means for each of said conductors for establishing a stable hysteretic state of at least said minimal length at a predetermined point along said conductors, a read out winding coupled to each of said conductors, a plurality of second coupling means for establishing hysteretic spots of less than said minimal length, said second coupling means being uniquely positioned between said first coupling means and said read out winding on each of said conductors in accordance with the code elements of a second notational system, means for energizing said first coupling means and for sequentially energizing said second coupling means to cause said stable hysteretic state to be extended from said predetermined point to said read out winding for only one of said conductors dependent upon the input code of said second notational system, and means for applying a pulse to said read out winding, on each of said conductors to obtain an output signal from said one conductor indicative of the code of said first notational system corresponding to said input code of said second notational system.

10. In a binary code translator, the combination comprising a plurality of magnetic conductors each exhibiting bistable remanence characteristics when excited over at least a minimal dimension, means for establishing a stable remanent spot in predetermined ones of said conductors including a first and second series of set windings respectively coupled to alternate ones of said conductors, each of said windings being of at least said minimal dimension, a plurality of extending windings smaller than said minimal dimension, said plurality of windings including a first and a second series of extending windings coupled to alternate pairs of said conductors adjacent to said set windings, a third and a fourth series of extending windings coupled to alternate quartets of said conductors adjacent to said last mentioned series, a fifth series of extending windings coupled to an octet of said conductors and a sixth series of windings coupled to no more than an alternate octet of said conductors, said fifth and said sixth series being adjacent to said third and fourth series, a read out winding coupled to each of said conductors adjacent to said fifth and sixth series of extending windings, means for sequentially energizing a predetermined one of said first and second series of set windings, and predetermined ones of said first, second, third, fourth, fifth, and sixth series of extending windings, means for energizing said read out winding, and circuit means coupled to said conductors for detecting the signal produced in one of said conductors when said read out winding is energized.

No references cited.